(12) United States Patent
Lee et al.

(10) Patent No.: US 6,294,885 B1
(45) Date of Patent: Sep. 25, 2001

(54) BEAM INDEX TYPE COLOR CATHODE RAY TUBE

(75) Inventors: Sung-Soo Lee, Seoul; Jae-Ho Lee, Kyungki-do, both of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/500,605

(22) Filed: Feb. 9, 2000

(30) Foreign Application Priority Data

Apr. 6, 1999  (KR) .................................................. 99-11886

(51) Int. Cl.$^7$ ...................................................... H01J 31/26
(52) U.S. Cl. .............................................. 315/370; 315/10
(58) Field of Search ...................................... 315/370, 371, 315/10; 358/67, 240; 348/813

(56) References Cited

U.S. PATENT DOCUMENTS 5,138,435 * 8/1992 Shimada et al. ...................... 358/67
5,343,119 * 8/1994 Takuma .................................. 315/10

* cited by examiner

*Primary Examiner*—Don Wong
*Assistant Examiner*—James Clinger
(74) *Attorney, Agent, or Firm*—Christie, Parker & Hale, LLP

(57) ABSTRACT

Disclosed is a display device having a beam index type color CRT that includes an index signal controller for controlling input and output of index signals, an index memory for temporally saving the index signals in units corresponding to of a screened image of a scene on a screen panel, and a switch for switching the index signals that is under the control of the index signal controller.

8 Claims, 4 Drawing Sheets

BEAM INDEX TYPE COLOR CATHODE RAY TUBE

BACKGROUND OF THE INVENTION (a) Field of the Invention

The present invention relates to a beam index type color cathode ray tube (CRT), and more particularly, to an improved beam index type color CRT capable of displaying images much more clearly by preventing a deterioration of the contrast of displayed images.

(b) Description of the Related Art

A shadow mask cathode ray tube (CRT) is generally employed as an image displaying unit for televisions, computer monitors, etc. because of its low cost and relative clear image quality.

However, the shadow mask CRT exhibits low beam current efficiencies because a large portion of the beam current is blocked from striking the phosphor and is absorbed by the shadow mask. Such beam current absorbed by the shadow mask forms high current areas on the shadow mask, which causes thermal expansion on the shadow mask, resulting in deterioration of color definition of the CRT.

Also, because the shadow mask CRT is susceptible to effects from the earth's magnetic field, an inner shield for intercepting the earth's magnetic field must be provided in the CRT.

To overcome these shortcomings of the shadow mask type CRT, beam index color CRTs without a shadow mask and inner shield have been developed.

FIG. 1 shows a conventional beam index type color CRT. As shown in FIG. 1, the beam index type color CRT includes a panel assembly 10 consisting of a screen panel 20 (in which phosphor is deposited) and a funnel 30, an electron gun 11 installed inside the funnel for emitting electron beams, a deflection yoke 12 mounted around a neck of the funnel 30 for deflecting the electron beams from the electron gun 11, an index beam (an ultra-violet ray) condenser plate 13 mounted on the curved part of the funnel 30, and photo sensor 14 for detecting and multiplying the index beam.

FIG. 2 shows an example of a conventional beam index type color CRT. As shown in FIG. 2, the beam index type color CRT includes a photo sensor 14 which detects the index beam which is generated from the beam index type color CRT upon impingement of the electron beam on index stripes thereof and responsively generates an index signal (an electric signal) depending on an amount of the detected index beam, a band pass filter (BPF) 20 for filtering a predetermined frequency of the index signals, a limiter 21 for limiting a predetermined amplitude of the index signals filtered by the filter 20, a phase-locked loop (PLL) 22 for synchronizing an index signal to color selecting signals, a start-set controller 23 for setting an index starting signal in accordance with the index signal filtered by the band pass filter 20, a ring counter 24 for counting each cycle of the filtered index signals, a color signal switch 25 for generating a color signal according to a index signal counted by ring counter 24, a run-in area controller 26 for controlling a run-in area on the screen panel, an index processing circuit 27 for synchronizing the color signal with the index signal and producing a synchronized signal, and an amplifier 28 for amplifying the synchronized signal and sending the amplified signal to the electron gun.

As represented in FIGS. 3 and 4, in the conventional beam index type color CRT, the inner surface of the screen panel 31 has parallel triads of red, green, and blue color phosphor stripes 33 vertically arranged with a black layer 32 between the adjacent color phosphor stripes 33. Index stripes 35 are provided on a transparent aluminum layer 34 which functions as a beam reflecting layer deposited on the triads of red, green, and blue (RGB) color phosphor stripes 33 and black layer 32.

On the one hand, in order to obtain the index signal as well as color signal, the index stripes must be constantly exposed to the electron beam in the beam index type CRT.

That is, the electron beam scans the screen panel even when the generation of color signals are not required for a dark image construction, such as when displaying a night scene.

Since the electron beam must constantly scans the screen panel for generating an index signal, even when a color signal is not required for a portion of the display panel, the constantly scanning electron beam activates the red, green, and blue phosphors of the portion such that unintended light emissions of the phosphors lowers the contrast of a beam Index type color CRT.

SUMMARY OF THE INVENTION

The present invention has been made in an effort to solve the problems of the prior art.

It is an object of the present invention to provide an improved beam index type color CRT capable of obtaining a clear image by preventing the contrast of the image from being deteriorated, This is accomplished by the scanning the screen panel with an electron beam that is modulated on the basis of index data obtained from a previous image.

To achieve the above object, the inner shield of the present invention comprises an index signal controller for controlling input and output of the index signals, an index memory for temporally saving the index signals in units of a screen panel scene, and a switch for switching the index signals that is controlled by the index signal controller.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
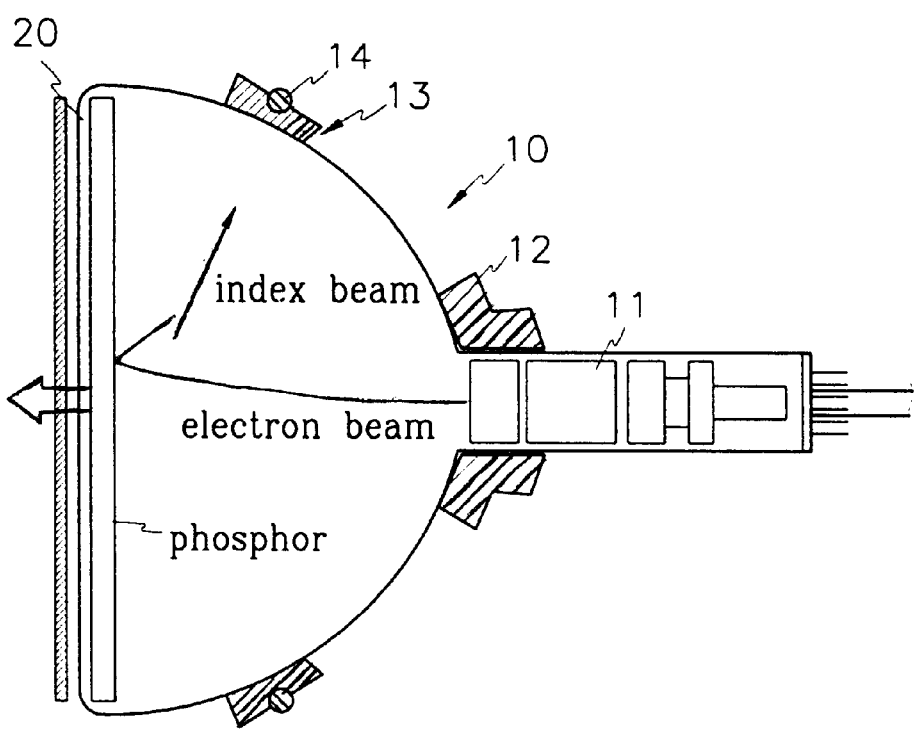
FIG. 1 is a sectional side view of a conventional beam index type color CRT.
Figure 2:
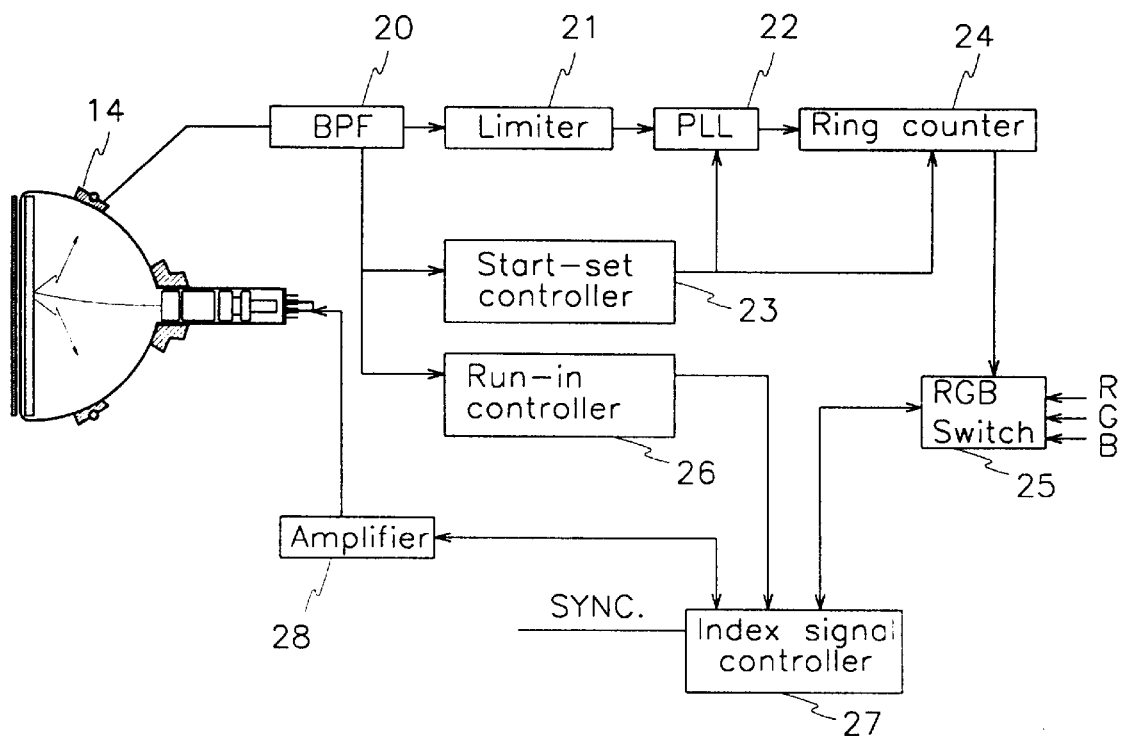
FIG. 2 is a functional block diagram of a conventional beam index type color CRT display system.
Figure 3:
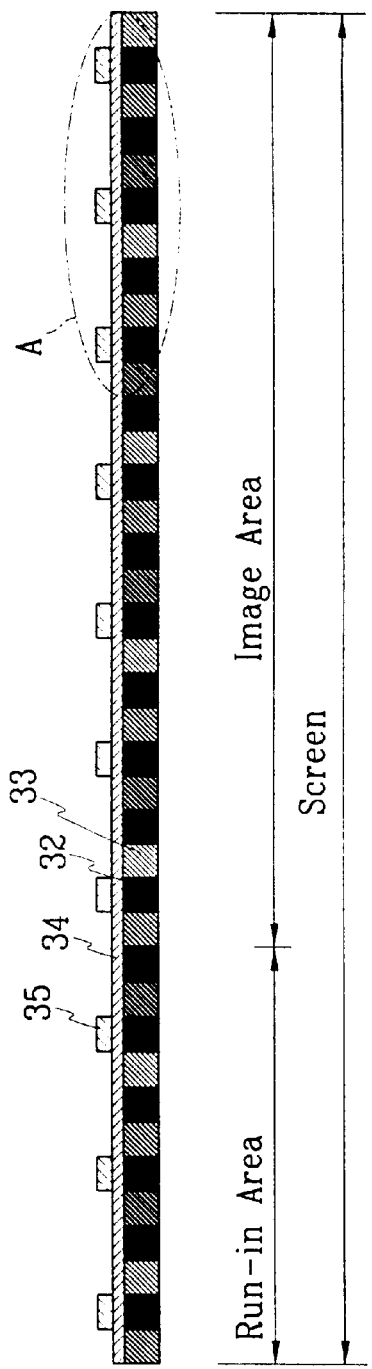
FIG. 3 is a cross-sectional view of a screen panel of the CRT in FIG. 1.
Figure 4:
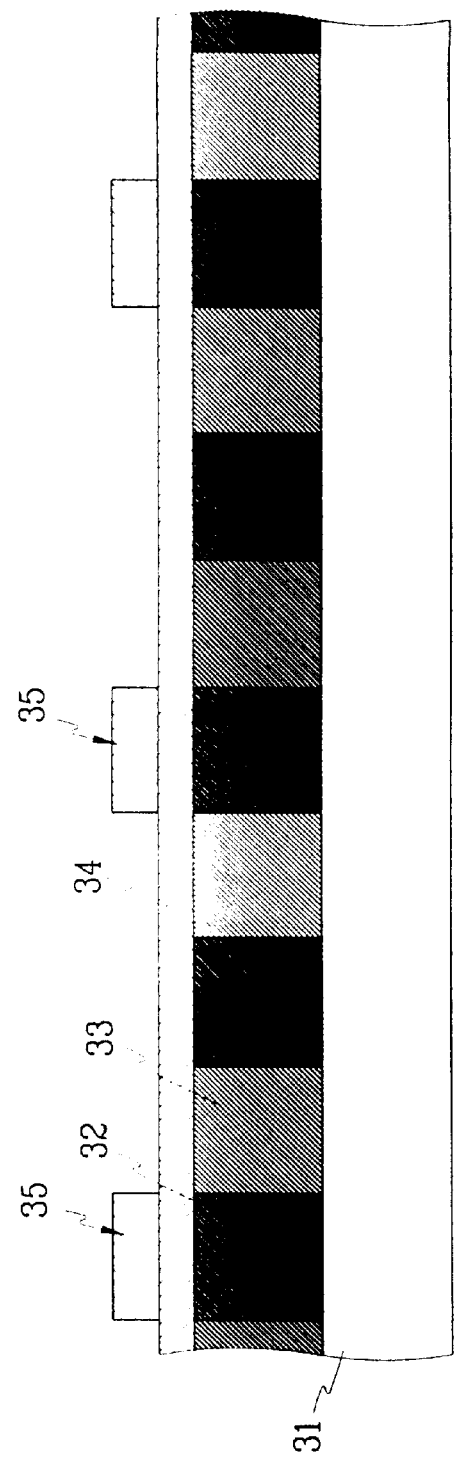
FIG. 4 is an enlarged view of detail A of FIG. 3.
Figure 5:
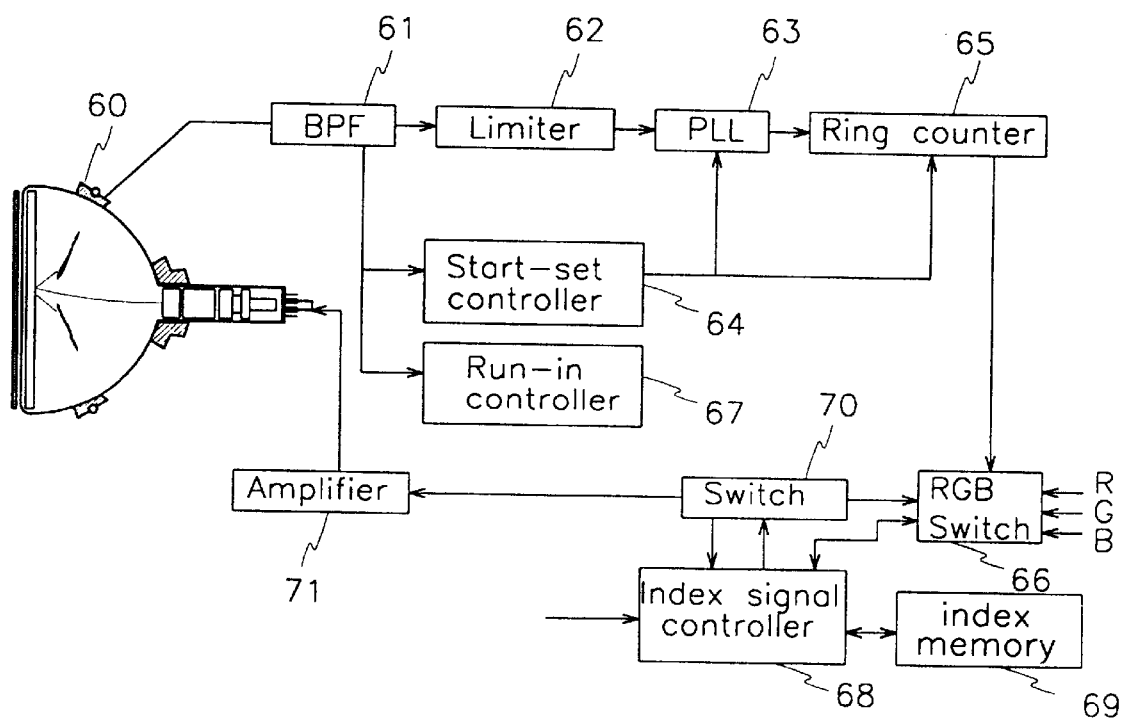
FIG. 5 is a functional block diagram of a beam index type color CRT display system according to the preferred embodiment of the present invention.

FIG. 5 is a functional block diagram of a beam index type color CRT display system according to the preferred embodiment of the present invention.

As shown in FIG. 5, the beam index type color CRT display system of the present invention comprises a photo sensor 60 which detects an index beam which is generated from the beam index type color CRT upon impingement of an electron beam on index stripes thereof and responsively generates an index signal (an electric signal) depending on an amount of the detected index beam, a band pass filter (BPF) 61 for filtering a predetermined frequency of index signal, a limiter 62 for limiting a predetermined amplitude of the index signal filtered by the filter 61, a phase-locked loop (PLL) 63 for synchronizing the frequency and phase of the index signal generated the photo sensor 60 to that of color selecting signals, a start setting controller 64 for setting a index starting signal in accordance with the index signal filtered by the band pass filter 61, a ring counter 65 for counting each cycle of the filtered index signal, a color signal switch 66 for generating a color signal according to the index signal counted by ring counter 65, a run-in controller 67 for controlling a run-in area on the screen panel, an index signal controller 68 for synchronizing the color signal and the index signal and producing a synchronized signal, an index memory 69 for temporally saving index signals from the index signal controller 68, a switch 70 which is controlled by the index signal controller 68, and an amplifier 71 for amplifying the synchronized signal and sending the amplified signal to the electron gun.

A beam index type CRT according to the preferred embodiment of the present invention will now be described with reference to the accompanying drawings.

An electron beam emitted from the electron gun scans the phosphor screen panel 20 and first impinges on the index stripes 35, then pass through aluminum layer 34 to activate the color phosphors. When the electron beam impinge upon the index stripes, the index stripes emit index beams which are detected by the photo sensor 60. The photo sensor 60 generates an index signal corresponding to the detected index beam and sends the index signal to the phase-locked loop 63 via the band pass filter 61 and the limiter 62. The index signal is filtered in frequency by the band pass filter 61 and limited in amplitude by the limiter 62. The phase-locked loop 63 synchronizes a phase of the index signal to that of a color gating signal and sends the color gating signal to the ring counter 65.

Also, the start set controller 64 generates an index start signal on the basis of the index signal coming from the band pass filter 61 and sends the index start signal to the phase-locked loop 63 and ring counter 65. The ring counter 65 counts each cycle of the filtered index signal and when this count reaches a predetermined value, the counter 65 generates an output signal and sends the signal to the RGB switch 66.

The run-in controller 67 generates a run-in area signal on the basis of the index signal from the band pass filter 61 and the run-in area signal to the index signal controller 68. The index signal controller 68 synchronizes color signals from the RGB switch 66 and the run-in area signal from the run-in controller 67 such that the RGB switch 66 sends a synchronized color signal to the electron gun via the switch 70 and the amplifier 71. Thus, the electron gun emits an electron beam according to the synchronized color signal from the RGB switch 66.

Also, the index signal controller 68 detects the index signals filtered by the band pass filter 61 and temporally saves all the index signals indexing the whole screen panel into an index memory 69. The index signals from one entire screened image corresponding to a scene are saved (or for more than one screen at the beginning of the operation of the CRT), and then updated every cycle of index signals that correspond to a scene. That is, when the index signals are saved in the index memory 69, the index signal controller 68 remembers the positions of the index stripes such that when constructing a following scene on the screen, the electron beam is precisely impinged on the corresponding color phosphors between the index stripes, resulting in enhancing the contrast of an image on the screen.

As described above, in the beam index type CRT of the present invention, since the index signals that correspond to a scene are temporally saved and used for constructing a subsequent scene, the electron beam is precisely impinges on the desired color phosphors, resulting in the prevention of screen image contrast from being deteriorated by a constant black level index signal.

While this invention has been described in connection with what is presently considered to be the most practical and preferred embodiment, it is to be understood that the invention is not limited to the disclosed embodiment. On the contrary, is intended to cover various modifications and equivalent arrangements included within the spirit and scope of the appended claims.

What is claimed is:

1. A beam index type color CRT comprising;
    a photo sensor for outputting an index signal;
    an RGB switch for outputting a color signal;
    an index signal controller for controlling and coupling the index signal and color signal;
    an index memory for temporally saving the coupled signals corresponding to a screened image of a scene on a screen panel for re-use by the CRT; and
    a second switch for controlling the flow of signals from the RGB switch and the index memory to the screen panel under the control of the index signal controller.

2. A beam index type color CRT of claim 1 wherein the index signal controller can receive more than one set of index signals corresponding to a screened image of a scene.

3. A beam index type color CRT of claim 1 wherein the index signal controller controls an electron beam to scan the screen panel on the basis of the previous index signals saved corresponding to a screened image of a scene.

4. A beam index type color CRT comprising:
    a means for receiving an index beam; and
    a means for controlling generation of an electron beam in response to an output signal from said means for receiving an index beam, said controlling means having a switch means and a memory.

5. A beam index circuit for a color CRT having a screen panel, comprising;
    an index signal controller;
    an index memory configured to temporally save an index signal corresponding to a screened image of a scene on the screen panel under control of the index signal controller;
    an RGB switch configured to output a color signal; and
    a second switch configured to couple the color signal from the RGB switch to the screen panel under the control of the index signal controller.

6. The beam index circuit of claim 5 wherein the index signal controller can receive a plurality of index signals each corresponding to a screened image of a scene.

7. The beam index circuit of claim 5 wherein the index signal controller is adapted to control an electron beam to scan the screen panel on the basis of the saved index signal corresponding to the screened image of the scene.

8. A beam index type color CRT, comprising
    a screen panel;

an electron gun configured to scan the screen panel with an electron beam;

an index stripe configured to generate an index beam from the electron beam;

a photo sensor configured to convert the index beam to an index signal;

an index memory configured to store the index signal for a screen image;

an index controller configured to control the electron gun as a function of the stored index beam;

an RGB switch configured to output a color signal; and a switch configured to couple the color signal from the RGB switch to the screen panel under control of the index controller.

* * * * *